United States Patent [19]

Balslev et al.

[11] 4,310,478

[45] Jan. 12, 1982

[54] REINFORCING FIBERS AND METHOD OF PRODUCING SAME CORONA TREATMENT OF THERMOPLASTIC FIBERS

[75] Inventors: Jørgen Balslev, Copenhagen-Holte; Laust Ø. Madsen, Esbjerg-Saedding, both of Denmark

[73] Assignee: Jacob Holm Varde A/S, Varde, Denmark

[21] Appl. No.: 55,287

[22] Filed: Jul. 6, 1979

[30] Foreign Application Priority Data

Jul. 7, 1978 [DK] Denmark .............................. 3081/78

[51] Int. Cl.³ ...................... B29C 17/14; B29D 7/20
[52] U.S. Cl. ..................................... 264/22; 264/233; 264/DIG. 47
[58] Field of Search ................. 264/22, DIG. 47, 129, 264/154, 233

[56] References Cited

U.S. PATENT DOCUMENTS

| | | | |
|---|---|---|---|
| 3,302,501 | 2/1967 | Greene | 264/DIG. 47 |
| 3,548,048 | 12/1970 | Hughes et al. | 264/DIG. 47 |
| 3,880,966 | 4/1975 | Zimmerman et al. | 264/22 |
| 3,998,916 | 12/1976 | van Turnhont | 264/22 |
| 4,178,157 | 12/1979 | van Turnhont et al. | 264/22 |

FOREIGN PATENT DOCUMENTS

| | | |
|---|---|---|
| 5830/78 | 4/1979 | Denmark . |
| 51-8377 | 1/1976 | Japan ..................................... 264/22 |
| 332064 | 1/1971 | Sweden . |
| 781742 | 8/1957 | United Kingdom . |
| 802254 | 10/1958 | United Kingdom . |
| 1469740 | 4/1977 | United Kingdom . |

*Primary Examiner*—James B. Lowe
*Attorney, Agent, or Firm*—Hubbell, Cohen, Stiefel & Gross

[57] ABSTRACT

Reinforcing fibers of plastic having a surface tension of from 40 dyn/cm to about the surface tension of water are disclosed. The fibers can be easily and uniformly disposed in matrices. For organic matrices, a surface tension of 40–50 dyn/cm is effective. For cement matrices, a surface tension about 70–75 dyn/cm is effective. The high surface tensions are obtained by a corona treatment and subsequent application of a hydrophilic avivage. Corona treatment may be performed on the fibers, or on films from which the fibers are made.

8 Claims, No Drawings

REINFORCING FIBERS AND METHOD OF PRODUCING SAME CORONA TREATMENT OF THERMOPLASTIC FIBERS

The present invention relates to reinforcing fibers of plastic which are suitable as fiber reinforcement in composite materials with a matrix of an inorganic binder such as Portland cement, alumina cement, fly ash cement, lime, gypsum, diatomaceous earth, puzzolan, and mixtures thereof, or in composite materials with a matrix of an organic binder, especially as fiber reinforcement in fiber cement products, such as pipes and plane and corrugated panels; concrete, putty and similar sealing; jointing or stopping filler compounds, and undercoat for cars.

It is known to use plastic fibers, in particular fibers of stretched plastic, as reinforcing fibers in a wide range of such materials.

Such fibers may be produced with a good resistance to the influences to which they may be subjected during their use in the fiber reinforced materials in question, and they may be prepared with excellent strength properties.

The efficiency of reinforcement fibers in a matrix, however, depends upon how well and in what amount the fibers can be effectively incorporated in the matrix and uniformly distributed throughout the matrix. It is known that many of the previous attempts of reinforcing e.g. cement matrices and similar materials with plastic fibers have been unsuccessful due to the fact that it was not possible to mix in and fully disperse the fibers in sufficiently high amounts, so that the final products became under-reinforced or contained lumps of poorly dispersed fibers, resulting in brittle composite materials even in cases where the fibers per se showed such qualities which would theoretically have improved the material properties substantially, had the fibers been sufficiently well dispersed.

The present invention provide reinforcement fibers of plastic which have modified surface properties that facilitate their incorporation and dispersion in a binder matrix and enhance the compatibility between the matrix and the fibers. The reinforcement fibers of the invention are characterized by having a surface tension in the range of from about 40 dyn/cm to about the surface tension of water.

While the surface tension of the fibers is preferably in the range of 40–50 dyn/cm when the binder matrix to be reinforced is organic, the surface tension is preferably about the surface tension of water, typically 70–75 dyn/cm, in particular 72–74 dyn/cm, when the matrix is inorganic. That the surface tension of the fibers is about or at least the surface tension of water may suitably be determined by the following "dispersion test": At a temperature of 20° C. and a relative humidity of 65%, 1.5 g of fibers of the invention, of between 2 and 35 dtex and having a length between 6 and 24 mm, are easily (by stirring 3–4 times) dispersed to 100% dispersion in 500 ml of distilled water when their surface tension is about that of water.

It has been found that when reinforcement fibers of plastic have a surface tension about the surface tension of water, it becomes possible, for the first time, to mix in and fully and uniformly disperse the plastic fibers in sufficiently high amounts in slurries of inorganic binder and water such as Portland cement and water, so that all fibers in the final dewatered product become surrounded by the matrix material and thereby become fully effective as reinforcement.

While previous attempts of incorporating plastic fibers into a neat cement matrix have typically resulted in materials containing only about 1% by weight or less of the plastic fibers, the high surface tension fibers of the present invention can be incorporated and uniformly dispersed in industrial scale in an amount of up to between 4 and 5% by weight, which results in a composite material where the ultimate strength and ultimate straining are dictated by the fibers and not by the brittle matrix material.

In addition to their unique dispersibility in cement slurries, the high surface tension fibers of the invention show an extraordinary affinity to fine cement particles. For example, once contacted with cement particles in a slurry, polypropylene fibers of the type described below having a surface tension about the surface tension of water retain cement particles at their surfaces to such an extent that they cannot be washed free from cement by flushing with water.

One particularly useful type of reinforcing fibers are polyolefin fibers prepared by stretching a polyolefin film preferably a polypropylene film, in a ratio of at least 1:15 to obtain a film thickness of 10–60μ and fibrillating the stretched material by means of a rotating needle or cutter roller to obtain fiber filaments of from about 2 to about 35 dtex. By this technique, which is disclosed in Danish Patent application No. 1924/78, German Patent application No. P 28 19 794.6, a fiber material may be obtained which has a tensile strength of at least 4000 kp/cm$^2$, modulus of elasticity of at least 10,000 N/mm$^2$, and an elongation at rupture of at the most 8%, and which shows non-smooth edges with many fribrils extending therefrom. These polyolefin fibers show unique advantages as reinforcement fibers in an inorganic binder matrix.

The fibers of the invention are preferably polyolefin, especially polypropylene, fibers of the type described in the above-mentioned patent applications, as these fibers show properties which make them ideal for being effectively anchored in e.g. a cement matrix and for co-operating with the matrix to reinforce the matrix.

The invention also provides a method for preparing reinforcement fibers of plastic having a surface tension in the range of from 40 dyn/cm to about the surface tension of water, said method comprising subjecting plastic fibers, or a film from which the plastic fibers are made, to a corona treatment.

Corona treatment of plastic film is a known treatment which is performed by applying high frequency electrical current through an electric conductor, for example a thin steel wire arranged in a distance of for example 1–3 mm above the moving band of plastic film to obtain a vigorous discharge over the width of the film. In the known art, such a treatment has been used to render the film susceptible to later application of printing inks or adhesives, but to the applicants' best knowledge, corona treatment has never been suggested for films which were to be subjected to mechanical fibrillation treatment, or for single fibers.

The effect of the corona treatment is of non-macroscopic character; it is presumed that the effect is partly due to splitting of polymer molecules at the film surface into small molecules to leave some "open ends", and partly due to a change of the electrical charge conditions in the film surface.

The effect of a corona treatment of a plastic film is suitably measured by determining the surface tension according to standard methods. For example, the following method has been used in determining the surface tension of stretched polypropylene films subjected to corona treatment: at a room temperature of 20° C. and a relative humidity of 65%, glycerol is applied on the film by means of a cotton wool stick so as form a thin liquid film, and the behaviour of the liquid film is observed. If the liquid film remains cohesive for about 2-3 seconds and is then split up in smaller portions, the surface tension of the film is identical to the surface tension of the glycerol and, hence, is about 64 dyn/cm.

When the reinforcing fibers are to be incorporated in an organic matrix, for example putty, it is prefered to perform the corona treatment to a less vigorous degree so as to obtain a surface tension of about 40-50 dyn/cm. When the matrix in which the reinforcing fibers are to be incorporated is an inorganic matrix made from an aqueous slurry, it is preferred to perform the corona treatment under more vigorous conditions to obtain a high surface tension. The regulation of the intensity of the corona treatment is obvious to the skilled art worker, and example of intensive corona treatments appear from the below examples.

A preferred embodiment of the invention comprises applying a wetting agent subsequent to the corona treatment. By such application of a wetting agent, a hitherto unattainable complete affinity between fibers and water is obtained, corresponding to a surface tension of the fibers which is of the order of the surface tension of water, or even a higher surface tension.

There seems to be a unique cooperation or synergism between the corona treatment and the wetting agent, and the combination of the corona treatment and the application of wetting agent results in a surface tension increase and a dispersibility of the fibers in water and aqueous slurries which has not previously been attainable. The reason for this may be that the corona treatment renders the surface of the plastic compatible with the wetting agent or capable of retaining the wetting agent to a hitherto unknown degree.

The wetting agent applied is preferably one which is particularly suitable for application on synthetic fibers, and suitable wetting agents are the so-called "hydrophilic avivages" (also called "hydrophilic rewetting agents" or "hydrophilic lubricants") which are well-known within textile technology and which are used to obtain various purposes in textile or fiber processing, such as for obtaining antistatic properties, for wetting fibers during processing, to lubricate fibers, etc. Examples of suitable hydrophilic avivages are LW421 from Henkel, Germany, Amoa P231 from Amoa Chemical Company, England, and Citrol A from Croda Chemicals Ltd., England. One particular hydrophilic avivage which has been found to function well in practice is a combination of Amoa P231 and Citrol A, the former being a lubricant product based on natural oils and emulsifier, and the latter being a typical antistating agent.

The amount of wetting agent applied is normally between 0.1 and 3% by weight, preferably of the order of about 1% by weight.

Polyolefin fibers of the type described in the above-mentioned patent applications are prepared by subjecting a polyolefin film, e.g. a polypropylene film, to stretching and thereafter subjecting the film to mechanical fibrillation to form long fibers which are thereafter either chopped in desired lengths or wound up as filament bands. Preferably, a heat treatment (heat-stabilization) of the stretched film is performed prior to the fibrillation. The corona treatment performed according to the present invention may be performed prior to the mechanical fibrillation, the application of the wetting agent being performed and prior to any chopping.

An alternative procedure which has been found to be advantageous for the preparation of polyolefin reinforcing fibers is to stretch the polyolefin film, treating the stretched film with a rotating needle or cutter roller to form fiber filaments of from about 2 to about 35 dtex, and thereafter heat stabilizing the fibers. When the fibers are prepared in this manner, the corona treatment is suitably performed on the heat-stabilized fibers. This is presumed to result in an even more effective corona treatment, in that all surfaces of the fibers are then treated.

The corona treatment according to the invention may be performed by means of equipment of the kind already in use in the conventional application of corona treatment, but, if necessary, modified to yield the necessary effect for achieving the high values of surface tension aimed at in the process of the invention. A suitable equipment for industrial use is described in the below examples. Instead of the metal bar electrodes used in the equipment described in the examples, the electrodes could also be wire electrodes or any other suitable shape electrodes, provided that they extend over the full width of the material being treated, including electrodes which have a cross section as a cylindrical section so as to conform closely with part of the roller surface over which the material to be treated is transported. The number of electrodes can be varied from one up to a series of consecutive electrodes, depending on the particular conditions to be established in each single case.

The incorporation of the fibers of the invention in a matrix may be performed by any of the known methods for incorporating reinforcement fibers and an easier incorporation and a more uniform dispersion will be obtained. In the preparation of building products of a similar type as asbestos cement products, the fibers of the present invention are preferably incorporated in a slurry which has previously been subjected to a high shear treatment of the same kind as described in the below Example 6.

The invention is further illustrated in the below examples, in which the term "a dispersion in water of 100%" means a complete dispersion of 1.5 g of fibers in 500 ml of distilled water in the test described above.

EXAMPLE 1

The polymer employed was polypropylene GWE 23 from ICI with a melt index of 3 g/10 minutes measured according to DIN MFI 230/2.16.

In a standard extrusion/stretch plant, the polypropylene was extruded into a blown tubular film at an extruder temperature of 180°-220° C., and the tubular film was cooled with cooling air at 18°-20° C. and cut into two film bands.

From the drawing station following the extruder, the film was passed through a hot air oven with an air temperature of 180° C. and an air velocity of 25 m/second. By using a higher roller speed in the stretch station following the hot air oven, the film was stretched in a ratio of 1:23. Thereafter, the film was heat-stabilized by passing a hot air oven with an air temperature of 180° C.

and an air velocity of 25 m/second, the film velocity being about 90 m/minute.

The thickness of the film was then about 20μ.

After the stretching and heat-stabilization, the film was subjected to a corona treatment using a 12,000 Watt Vetaphona equipment: Generator T 12,000 AX, external transformer TH 12025 for 3×380 volt, 50 HZ using a roller/electrode system TW 4000 EN/SP. The equipment comprised four rollers, two on which the film passed over the rollers and was treated on its upper side from metal bar electrodes arranged over the rollers, and thereafter two under which the film passed and was treated from metal bar electrodes arranged under the rollers. The distance between the film and the electrodes was about 1-3 mm. After the corona treatment, the surface tension of the film had been increased to 64.3 dyn/cm, as assessed by measuring on a sample of the film.

The film was fibrillated to form fibers of from 2 to 30 dtex by means of a Reifenhäuser FI-S-0800-03-01 fibrillator with 13 needles per cm in each of two consecutive staggered needle rows placed with the same distance as the interval between two needles. The fibrillation ratio (the ratio between the film advancing velocity and the circumferential velocity of the fibrillator roll) was 1:3. Thereafter, 1% by weight of hydrophilic avivage (a mixture of 4 parts of Amoa and 1 part of Citrol) was applied as a 1:9 solution, and the fibers were cut in lengths of 6, 12, 18, and 24 mm in a staple cutter.

The tensile strength of the fibers prepared in this way was 5.9 cN/dtex, the elongation at rupture was 5%, and the modulus of elasticity (1%) was 12,000 N/mm$^2$.

The fibers showed a dispersion in water of 100%.

EXAMPLE 2

The polymer used was polypropylene GSE16 from ICI with a melt index of 0.8 g/10 minutes measured according to DIN MFI 230/2.16.

In a standard extrusion/stretch plant, the polypropylene was extruded into a blown tubular film at an extruder temperature of 180°-230° C., and the tubular film was cooled with cooling air at 18°-20° C.

From the drawing station following the extruder, the film was passed through a hot air oven with an air temperature of 180° C. and an air velocity of 25 m/second. By using a higher roller speed in the stretch station following the hot air oven, the film was stretched in a ratio of 1:20.3. Thereafter, the film was passed through a hot air oven with an air temperature of 220° C. and an air velocity of 25 m/second and simultaneously stretched in a ratio of 1:1.16 by keeping a higher roller speed in the drawing station following the hot air oven. The total stretch ratio obtained through the two stretching operations was 1:23.6.

The thickness of the film was then 20μ.

After the stretching and heat-stabilization, the film was subjected to a corona treatment in the same manner as described in Example 1. After the corona treatment, the surface tension of the film had been increased to 64.3 dyn/cm, as assessed by measuring on a sample of the film.

The film was then fibrillated in the same manner as described in Example 1. Thereafter, 1% by weight of hydrophilic avivage (Henkel LW 421) was applied as a 1:9 aqueous emulsion, and the fibers were cut in lengths of 6, 12, 18, and 24 mm in a staple cutter.

The tensile strength of the fibers prepared in this way was 5.9 cN/dtex, the elongation at rupture was 5%, and the modulus of elasticity (1%) was 12,000 N/mm$^2$.

The fibers showed a dispersion in water of 100%.

EXAMPLE 3

The same starting material and a similar procedure as in Example 1 were used, with the exception that the tubular film was cut into 40 bands of a width of about 15 mm each, and that the stretching ratio was 1:17. The fibrillation was performed with single needle rows in the Reifenhäuser fibrillator to obtain flat bands of about 10 mm which were wound up in rolls.

EXAMPLE 4

The polymer employed was polypropylene GWE 23 from ICI with a melt index of 3 g/10 minutes measured according to DIN MFI 230/2.16.

In a standard extrusion/stretch plant, the polypropylene was extruded into a blown tubular film at an extruder temperature of 180°-220° C., and the tubular film was cooled with cooling air at 18°-20° C. and cut into two film bands.

From the drawing station following the extruder, the film was passed through a hot air oven with an air temperature of 160° C. and an air velocity of 25 m/second. By using a higher roller speed in the stretch station following the hot air oven, the film was stretched in a ratio of 1:17.

The film was fibrillated to form fibers of from 2 to 30 dtex in the same manner as described in Example 1. The resulting fibers were heat-stabilized by passing through a hot air oven with an air temperature of 160° C. and an air velocity of 25 m/second. After the heat-stabilization, the fibers were corona treated using the same procedure and the same equipment as described in Examples 1 and 2. Thereafter, 1% by weight of hydrophilic avivage (a mixture of 4 parts of Amoa and 1 part of Citrol) was applied as a 1:9 solution, and the fibers were cut in lengths of 6, 12, 18 and 24 mm in a staple cutter.

The tensile strength of the fibers prepared in this way was 5.3 cN/dtex, the elongation at rupture was 6%, and the modulus of elasticity (1%) was 13,000 N/mm$^2$.

The fibers showed a dispersion in water of 100%.

EXAMPLE 5

The same procedure as in Example 1 was used with the only difference that the stretching ratio was 1:17 instead of 1:23.

The tensile strength of the fibers prepared in this way was 5.3 cN/dtex, the elongation at rupture was 6%, and the modulus of elasticity was 13,800 N/mm$^2$.

The fibers showed a dispersion in water of 100%.

EXAMPLE 6

Fiber-reinforced cement sheets having a thickness of 6 mm were prepared using on the one hand corona- and avivage-treated 12 mm polypropylene fibers prepared in accordance with Example 5, and on the other hand avivage-treated polypropylene fibers prepared in exactly the same manner as described in Example 5, but without the corona treatment.

The procedure for preparing the sheets was as follows: Portland cement (rapid hardening), 0.15% by weight of Methocell 228 (methyl cellulose from Dow Chemical), 3.4% by weight of paper pulp cellulose (birch) and 6.1% by weight of Rockwool ® fibers (mineral fibers having a diameter of about 5μ and a length of about 0.1–5 mm), and water to a water:solids ratio of 1.8:1 were gently mixed together by agitation, and the resulting slurry was thereafter refined by 5 passages through an emulsor "Alexanderwerke" having a stator/rotor distance of 0.4 mm rotating at up to 3,000 r.p.m. To the thus refined slurry, 4.5% by weight, of the 12 mm polypropylene fiber were added, and further mixing for 1.5 minutes was carried out in a shaking type mixer: "Tintorama". The re-sulting slurry was cast in a laboratory paper sheet forming apparatus and dewatered by suction and precompression. The test sheets were then compressed for 18 hours at 10 kp/cm$^2$, and thereafter stored for 4 days in a moist atmosphere and for 9 days in normal laboratory atmosphere and were thus ready for testing after a fortnight.

The resulting sheets have a reinforcement of 7% by volume of the polypropylene fiber. The cellulose fibers (4% by volume) and the Rockwool ® fibers (3% by volume) served mainly as carrier fibers during the production stages.

After the curing, 4 test specimens for bending tests and 6 specimens for impact tests were cut out from each sheet, and the bending test specimens were provided with electrical strain gauges at the middle of both sides for plotting the bending stress-strain curves of the material.

The test results appear from the following table which states:

$\gamma_f$ = density of the material at time of testing,
$\gamma_t$ = density after drying in an oven at 105° C.,
$\delta_b{}^u$ = bending strength (modulus of rupture),
$\epsilon_c{}^u$ = ultimate straining in the compressive zone,
$\epsilon_t{}^u$ = ultimate straining in the tensile zone,
E = modulus of elasticity,
S = impact strength.

The values for $\delta$, $\epsilon$, and E are average values of 4 specimens, and the values for S are average values for 6 specimens. The numbers in brackets in the table state the spread (coefficient of variation in % of the average value).

TABLE

| Material properties of fiber cement plates. | | |
|---|---|---|
| | Polypropylene Fibers | |
| | Corona treated | Not corona treated |
| $\gamma_f$ | 1.67(1%) | 1.68(3%) |
| $\gamma_t$ | 1.52(0.2%) | 1.51(2%) |
| $\sigma_b{}^u$, kp/cm$^2$ | 232(3%) | 216(7%) |
| $\epsilon_c{}^u$, % | 0.32(11%) | 0.36(11%) |
| $\epsilon_t{}^u$, % | 1.38(6%) | 1.36(17%) |
| E, 10$^5$ kp/cm$^2$ | 1.84(2%) | 1.75(6%) |
| S, kpcm/cm$^2$ | 15.9(15%) | 12.0(23%) |

It appears from the table that improvements in the strength and elasticity properties of the material were obtained by using the corona treated fibers (improvement in bending strength about 7%, in modulus of elasticity about 5%, and in impact strength about 13%). However, in addition to this, the results also show that the spread in the material properties have been drastically reduced, which shows that a better material is obtained with much more uniform dispersion of the fibres in the final product when using the corona treated fibers.

We claim:

1. A method for producing reinforcing fibers of plastic having a surface tension in the range of from 40 dyn/cm to about the surface tension of water, comprising subjecting plastic reinforcing fibers to a corona treatment, and applying a wetting agent on the fibers subsequent to the corona treatment.

2. A method for producing reinforcing fibers of plastic having a surface tension in the range of from 40 dyn/cm to about the surface tension of water, comprising subjecting a plastic film to a corona treatment, fibrillating the film to form fibers and applying a wetting agent on the fibers subsequent to the corona treatment.

3. A method as claimed in any one of claims 1 or 2 in which the wetting agent is a hydrophilic avivage.

4. A method as claimed in claim 2 for producing reinforcing fibers of polyolefin, comprising stretching a polyolefin film, corona-treating the film, and fibrillating the corona-treated film.

5. A method as claimed in claim 4 for producing reinforcing fibers of polypropylene, comprising stretching a polypropylene film in a ratio of at least 1:15 to obtain a film thickness of 10–60μ, corona-treating the stretched film, fibrillating the corona-treated film by means of a rotating needle or cutter roller to obtain fiber filaments of from about 2 to 35 dtex.

6. A method as claimed in claim 2 for producing reinforcing fibers of polyolefin, comprising stretching a polyolefin film, fibrillating the stretched film, and corona-treating the resulting fibers.

7. A method as claimed in claim 6 for producing reinforcing fibers of polypropylene, comprising stretching a polypropylene film in a ratio of at least 1:15 to obtain a film thickness of 10–60μ, fibrillating the stretched film by means of a rotating needle or cutter roller to obtain fiber filaments of from about 2 to about 35 dtex, and corona-treating the fibers.

8. A method for producing reinforcing fibers of polypropylene, comprising stretching a polypropylene film in a ratio of at least 1:15, fibrillating the stretched film by means of a needle or cutter roller, and heat stabilizing the resulting fibers, corona treating the heat stabilized fibers and applying a wetting agent on the corona treated fibers to impart to the fibers a surface tension in the range of from 40 dyn/cm to about the surface tension of water.

* * * * *